United States Patent Office 3,261,757
Patented July 19, 1966

3,261,757
NUCLEAR FUEL ELEMENT
Meyer Steinberg, Huntington Station, Gerald Farber, Elmont, and David H. Gurinsky, Center Moriches, N.Y., assignors to the United States of America as represented by the United States Atomic Energy Commission
No Drawing. Filed Oct. 22, 1965, Ser. No. 502,694
7 Claims. (Cl. 176—70)

This invention is related to novel compositions of matter useable as fuel elements in nuclear reactors. More particularly it is related to nuclear fuel elements having superior corrosion resistance which are useful in chemonuclear reactors. The invention described herein was made in the course of, or under, a contract with the U.S. Atomic Energy Commisison.

Since the discovery that energy derived from nuclear fission could aid in the carrying out of chemical reactions, the art has sought to develop nuclear fuel elements for use in chemonuclear reactors. The use of chemonuclear reactors has been inhibited due to the susceptability of conventional nuclear fuel elements to corrosion from the reactants and/or reaction products. Prior art fuel elements have met this problem by sacrificing thermal stability and resistance to radiation damage by using ceramic and low temperature melting glasses.

It is an object of this invention to provide those skilled in the art with nuclear fuel elements having excellent corrosion resistance, thermal and radiation stability and which are ideally suited for use in a chemonuclear fuel reactor.

This and other objects of this invention will in part be obvious and will in part be shown hereinafter.

We have unexpectedly discovered a nuclear fuel element capable of use in a chemonuclear reactor having vastly increased corrosion and thermal resistance properties comprising an inner core composed of an alloy containing from about 1 to about 30 weight percent uranium based on the total weight of the inner core, and from about 70 to about 99 weight percent palladium based on the total weight of the inner core, said inner core having a layer of platinum covering the external surfaces of said core, the platinum layer having a thickness ranging from about 0.2 micron to about 5 microns. We have further found that the corrosive resistance of the binary alloy making up the inner core of our novel fuel elements can be further enhanced by the addition of platinum to the alloy making said cores out of a ternary alloy containing from about 50 to about 98 weight percent palladium, from about 1 to about 30 weight percent uranium, and from about 1 to about 20 weight percent platinum, said weight percents being based on the total weight of the inner core. While the binary alloys of uranium and palladium coated with platinum are useable in most chemonuclear processes and our fuel elements have greater corrosion thermal and radioactive resistance than other elements proposed for use in such processes, the alloy addition of platinum to our binary alloys to form ternary alloys gives even greater corrosion resistance to our novel elements. The ternary alloy cores should be utilized in those processes wherein extreme corrosion thermal and radiation conditions exit. The degree of enrichment of uranium itself found useable in our novel alloys can vary widely, containing from about 2 to about 90 weight percent of the uranium$^{235}$ isotope based on the total amount of uranium present in the element and in the preferred embodiment of our invention we use enriched uranium made up of about 93.3 weight percent of the uranium$^{235}$ isotope.

We have further discovered that the preferred shape for our fuel elements is in the form of a thin foil having a thickness ranging from about 2 to about 6 microns. While such foils standing alone have little independent structural stability, they can be shaped into various two or even three dimensional honeycomb structures with the outside of the comb being affixed to a more rigid frame structure. A shape for such a structure and a method of producing same is given in more detail in the example given below. Of course our foil fuels can be utilized in any similar type structure and can be produced by many methods well known to those skilled in the art. We prefer utilizing a foil shaped fuel element because a two dimensional array has greater structural stability.

A method of producing our novel element is contained in the example given below. Our invention, of course, is not to be limited to any particular method since it will be obvious to those skilled in the art that our element can be used in the form of either ordered or random arrays.

The following example is given to illustrate the practice of our invention:

*Example I*

The uranium-palladium (U-Pd) alloy used in this example was made by melting fully enriched uranium with pure palladium in an arc melt furance in a water cooled copper mold. Uniformity was obtained by puddling and the fact that U-Pd forms a solid solution. The flat U-Pd ingot thus produced weighed 141.5 grams and was 7.3 cm. long, 11.6 cm. wide, 0.138 cm. thick. This ingot was inserted in a steel frame and rolled on a 2-high mill until it had a thickness of about 0.1 inch. The rolled U-Pd slab was removed from its steel case and a 0.01 inch thick sheet of platinum was placed on each face of the rolled slab of alloy and the entire assembly was maintained at a pressure of less than one micron of mercury and kept at a temperature of about 900° C. for about one hour to obtain a diffusion metal to metal bond by maintaining a physical pressure of 600 lbs. per sq. inch on the alloy throughout said heating.

The platinum coated U-Pd alloy slab was then rolled on a 4-high mill until it had a thickness ranging between 1 and 2 mils (0.001 to 0.002 inch 2.5 to 5.0 microns).

Two inch wide strips of the platinum coated U-Pd sheet were then further rolled on a multiple roller fine rolling mill until they had a total thickness of about 0.1 mil (2.5 microns). These thin strips were found to be useful as nuclear fuel elements for use in a chemonuclear reactor, however, due to the thinness of each individual strip we found it desirable to link several of the strips together in a geometrical structure such as a honeycomb to give them added structural stability.

One method of doing this is to cut the coated foil fuel strips into suitable lengths and rule a compound which will prevent welding onto the surface of the individual foils. Thereafter the lengths of ruled foils are layed over each other with care being taken to see that the areas of the individual foil having a coating of a weld preventing substance, are offset against each other. The multilayer assembly is put into a clamp and then placed into a diffusion bonding vacuum furnace until diffusion metal to metal bonds on adjacent layers are made in the areas of the layers wherein the weld inhibiting agent was not covering the layers. The bonded layers can then be cooled and manually expanded into a honeycomb structure. The honeycombed structure can then be cut into circular sections and inserted into a piece of stainless steel pipe with the outer edges of the structure being spot welded to the sides of the tube. We have made such structures and found that they have excellent structural strength and stability properties which renders them extremely useful as nuclear fuel elements useable in a chemonuclear reactor.

Strips of the foil previously produced in this example were tested as follows:

A strip 4 mm. wide by 30 mm. long was suspended in a quartz tube; the tube having an inside diameter of one inch.

The foil containing tube was then filled with air until a pressure of 68 atmospheres was reached and the tube was sealed. The sealed tube was then placed in a nuclear reactor in a neutron flux of $1 \times 10^{13}$ neutrons per sq. cm. per second and exposed to this flux for 72 hours. The neutron flux was absorbed by the foil causing fissioning of the $U^{235}$ contained therein. The fission fragments escaped the foil causing a chemical reaction to take place; nitrogen and oxygen within the sealed tube were converted to nitrogen dioxide and the fission fragment energy deposition efficiency of 40 percent was obtained. At the end of the experiment the foil was examined microscopically and found to have suffered no damage to its physical integrity on account of its exposure to radiation.

An uncoated foil of U-Pd alloy was prepared and treated in the same manner and was found to disintegrate due to corrosion and radiation. Platinum coated ternary alloys of uranium, palladium, and platinum were formed into foils as above and found to also be impervious to radiation damage.

We claim:

1. A nuclear fuel element for use in a chemonuclear reactor comprising: an inner core composed of an alloy containing from about 70 to about 99 weight percent of palladium, based on the total weight of the core, and from about one to about 30 weight percent uranium based on the total weight of the core, said inner core having a layer of platinum covering the external surface of said core, the platinum layer having a thickness ranging from about 0.2 to about 6 microns.

2. A nuclear fuel element in accordance with claim 1 wherein said inner core contains about 20 weight percent uranium based on the total weight of the core.

3. A nuclear fuel element in accordance with claim 2 wherein said layer of platinum has a thickness of not more than 0.3 micron.

4. A nuclear fuel element for use in a chemonuclear reactor comprising an inner core composed of an alloy containing from about 50 to about 98 weight percent palladium based on the total weight of the core, from about 1.0 to about 30 weight percent uranium based on the total weight of the core, and from about 1.0 to about 20 weight percent platinum based on the total weight of the core, said inner case having a layer of platinum covering the external surface of said core, the platinum layer having a thickness ranging from about 0.2 micron to about 6 microns.

5. A nuclear fuel element in accordance with claim 4 wherein said inner core contains about 20 weight percent uranium based on the total weight of the core.

6. A nuclear fuel element in accordance with claim 5 wherein said inner core contains about 10 weight percent platium based on the total weight of the core.

7. A nuclear fuel element in accordance with claim 6 wherein said layer of platinum has a thickness of not more than 0.3 micron.

No references cited.

BENJAMIN R. PADGETT, *Acting Primary Examiner.*

M. J. SCOLNICK, *Assistant Examiner.*